Dec. 18, 1956 A. B. ZEISSLER 2,774,899
DUAL RING SUPPORT FOR END TURNS OF FORM WOUND COILS
Filed July 29, 1955
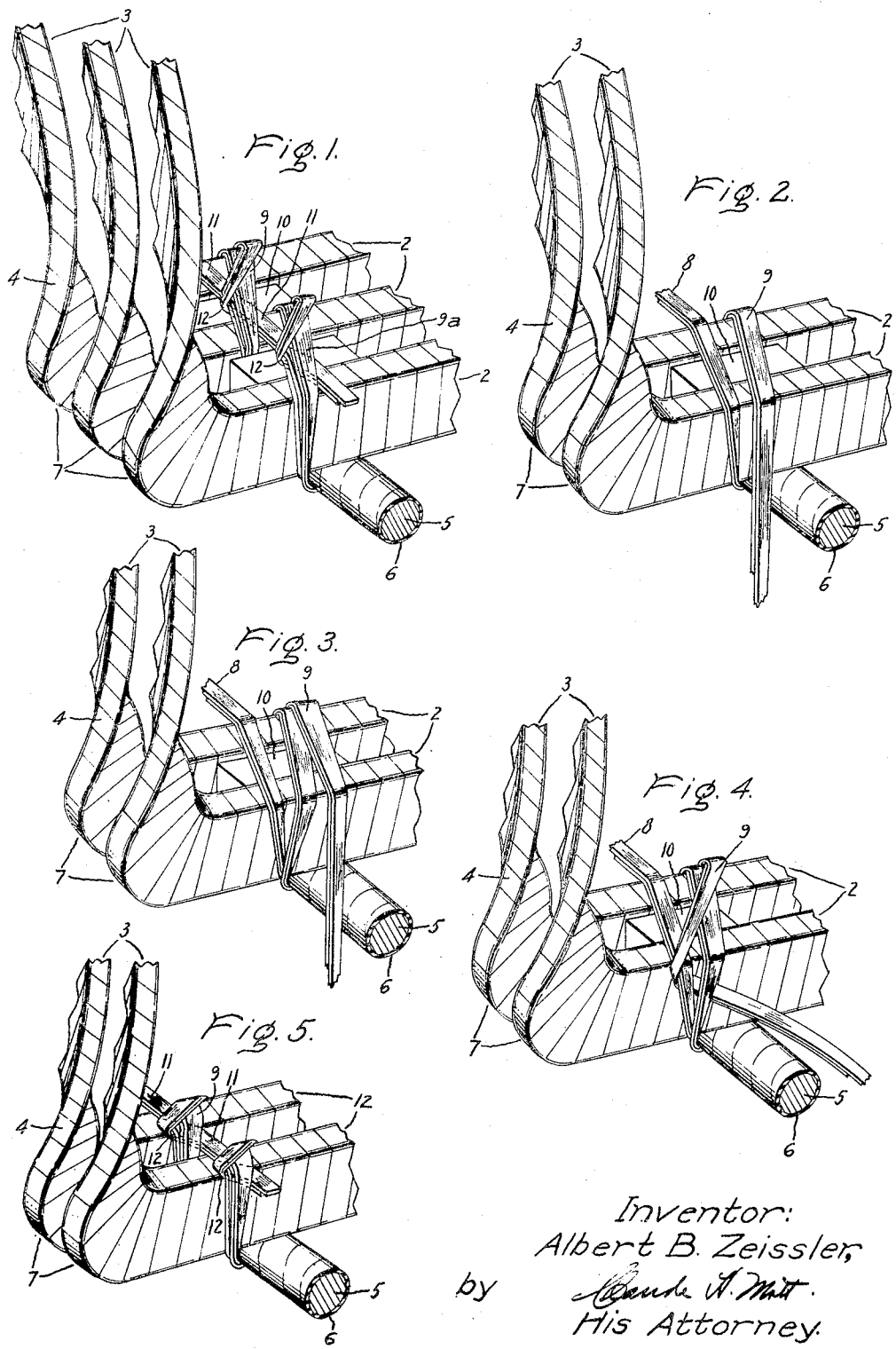
Inventor:
Albert B. Zeissler,
by His Attorney.

United States Patent Office 2,774,899
Patented Dec. 18, 1956

2,774,899

DUAL RING SUPPORT FOR END TURNS OF FORM WOUND COILS

Albert B. Zeissler, Schenectady, N. Y., assignor to General Electric Company, a corporation of New York Application July 29, 1955, Serial No. 525,135

5 Claims. (Cl. 310—260)

This invention relates to the supporting of coils for dynamoelectric machines and more particularly to supporting the stator end turns thereof and is an improvement over the invention of the application of Almy D. Coggeshall and Linn T. Stafford, Serial No. 379,165 filed September 10, 1954, now Patent 2,747,118, which is assigned to the assignee of the present application.

In dynamoelectric machines, especially those of high capacity, heavy surges of current frequently occur and produce powerful magnetic fields of either attraction or repulsion between the adjacent end turns of the stator coils causing considerable stress on the end turns. Starting currents, for example, may be approximately 5 to 8 times the normal full load operating current of the machine. The stress caused by these magnetic fields may result in the deformation of the end turns and damage to their insulation. Therefore, supporting means must be provided to brace and reinforce the end turns.

In the aforesaid copending patent application, a plurality of loops of roving impregnated with a thermosetting resin were laced through the end turns to envelop portions of the end turns and a single support ring positioned concentric with the end turns. This provided an arrangement, upon the curing of the resin in which the roving was shrunk around both the support ring and the end turns to form rigid self-tightening clamps securing the end turns to the support ring. This arrangement has been found to satisfactorily provide adequate support for the end turns in most applications.

However, it is desirable to utilize a second concentric ring to provide additional support for the ends turns so that the mechanical stresses on the insulation are further reduced thereby to increase the life of the coils. Heretofore this has been difficult because the clearance provided within the nose of each coil between the inner and outer arms of the end turns is normally approximately 1/8″. Further there has previously been no method whereby a ring could be easily inserted into the closed loop forming the end turns of the coils during the assembly of a stator. Moreover, a second support ring cannot be positioned within the bore defined by the inner arms of the end turns because of the potential interference with the insertion and removal of the rotor from the machine.

It is an object of this invention to provide an arrangement whereby the coil end turns of a dynamoelectric machine are supported by a pair of cooperating support rings.

It is another object of this invention to provide a method for providing a support ring within the loop of the end turns of the coil of a dynamoelectric machine.

Other objects and advantages of this invention will become apparent and this invention will be better understood by reference to the accompanying drawing and description, and the features of novelty which characterize this invention will be pointed out with particularity in the claims annexed to and forming part of this specification.

In accordance with one aspect of this invention, an insulated support ring is placed in position around the outer periphery of the outer arms of the coil end turns of a stator of a dynamoelectric machine. As the form wound coils of the stator are sequentially placed in the stator slots during assembly, an insulated spacing block is placed between each adjacent pair of outer arms and each pair of outer arms are laced to the support ring with impregnated roving.

The roving is thereafter threaded through the loop lacing the adjacent pair of outer arms to the outer support ring and drawn tightly to pull the encircled pair of outer arms against the outer support ring. With the outer arms thus positioned, the loop is cinched at its inner periphery to prevent its loosening. The free end of the roving is then laced about one of the previously secured outer arms and the next adjacent outer arm, and is again drawn tightly to pull this pair of outer arms snugly against the outer supporting ring by means of a cinch or knot in the loop at its inner periphery. This arrangement thus provides a crossover between adjacent loops at their inner peripheries so that the crossover portions of the roving cooperate to provide a second support ring within the coil end turns and generally concentric with the outer support ring.

In the drawings,

Fig. 1 is a fragmentary perspective view of a stator end turn for a dynamoelectric machine incorporating this invention;

Fig. 2 is a fragmentary perspective view of a pair of end turns showing an intermediate step in the securing of the end turns, Figs. 3 and 4 illustrate, respectively, subsequent steps in the tying of the end turns to the supporting ring.

Fig. 5 is a fragmentary perspective view of a modified form of this invention.

Referring now to the drawing, there is shown in Fig. 1 a fragment of the stator coil of a dynamoelectric machine (otherwise not shown) which is generally formed of a plurality of form wound coils having end turns comprising outer arms 2 and inner arms 3. The end turns are insulated in any suitable manner as by plurality of helically wound overlapping convolutions of tape 4. A support ring 5 here shown as being covered with insulation 6 is placed around the outer periphery of the outer arms 2 adjacent their ends 7. After support ring 5 is placed in position, a roving material 8 shown as having two ends per strand, is formed into loop which encircle a pair of adjacent outer arms 2, the support ring 5 and a spacing block 10 best shown in Fig. 2. Thereafter, as shown in Fig. 3, a second loop is laced around the same pair of outer arms 2, the spacing block 10, and the support ring 5 to provide a loop 9 of the required strength. With the roving thus arranged, the free end of the roving is threaded under the pairs of loops as indicated in Fig. 4 and cinched tight with the cinch 12 being positioned at the inner periphery of outer arms 2 to pull the outer arms 2 firmly against the support ring 5. It will be further noted that during this cinching operation, as best shown in Fig. 1, the crossover portions 11 of the roving 8 is pulled into alignment between adjacent knots 12 to further tighten the roving and to cause the crossover portions 11 of the roving between adjacent loops to become peripherally aligned substantially in the plane of support ring 5.

Other pairs of outer coil sides with their spacing blocks are progressively encircled as by loop 9a of Fig. 1 and secured to the supporting ring in a like manner until all pairs of outer arms 2 are so supported. It will be observed that the crossovers 11 connecting adjacent cinches or knots 12 on the inner periphery of the outer arms 2 form a second support ring within the nose of the coils and cooperates with support ring 5 to prevent the coil end turns from twisting to provide maximum mechanical support. Moreover, it will be observed that by cinching the loops on the inner periphery of the outer arms 2 in the manner illustrated, with the loops being disposed at a slight angle with respect to the plane of support ring 5, that the inner ring formed by the crossovers 11 is automatically tightened in the formation of the cinches for each loop.

After the assembly of the coils and roving 8 is completed, the thermosetting resinous material with which the roving is impregnated is cured so that the loops 9 and 9a and the crossovers 11 are converted to rigid members comparable in strength to iron.

In this finished state the straight crossover portions 11 between adjacent cinches 12 serve to prevent relative movement between the inner periphery of the outer arms 2. Moreover, the loops 9 and 9a and the cinches 12 are integrally bonded together and will not loosen under the vibrational stresses imposed during operation of the machine.

The following composition has been found to be a suitable thermosetting resinous material with which to impregnate roving 8: (1) a polymerizable unsaturated alkyd resin obtained by the esterification reaction of a mixture of ingredients comprising a polyhydric alcohol and an alpha unsaturated alpha-beta polycarboxylic acid, e. g., diethylene glycol maleate; (2) a copolymerizable different monomer, e. g., styrene, polyesters compatible with the above unsaturated alkyd resin obtained by esterification of allyl alcohol with a polybasic acid, specifically a polycarboxylic acid, e. g., diallyl phthalate, etc., in the ratio, by weight, of about 1 part to 1 to 3 parts of (1); (3) a catalyst for accelerating the copolymerization of the ingredients of (1) and (2), e. g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e. g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

This composition is particularly well adapted for use in impregnating a self-tightening coil supporting member because it has a volume shrinkage coefficient of 8% and a linear shrinkage coefficient of 2% which it imparts to the loops 9 and the crossovers 11 during curing.

This impregnated roving material is disclosed and claimed in the aforesaid copending application S. N. 379,169 to Coggeshall et al. now Patent 2,747,118.

The impregnating composition may be applied to the roving 8 in any desired manner, preferably by dipping the roving in a bath of an impregnating material. After this impregnation of the roving, it is dried to evaporate the solvents therefrom, so that the roving becomes tack-free. It may then be stored for a period over three months or used immediately.

After the flexible roving 8 is assembled on the stator end turns, the impregnating composition described herein may be cured, as for example, by baking the rotor assembly at 135° C. for approximately one-half hour.

Referring now to Fig. 5 there is shown a modification of the invention in which the space blocks 10 are eliminated and in which each outer coil side is individually cinched and secured to the support ring 5. In this arrangement each coil is individually tied to the support ring 5 by a loop 9 and thereafter cinched by a half-knot and, upon the curing of the resinous impregnating material in the roving, the straight crossover portions 11 between adjacent cinches serve to act in compression as well as in tension to hold the outer arms 2.

From the foregoing it is apparent that this invention provides a means for supporting the winding end turns of a stator coil for a dynamoelectric machine by the use of an initially flexible impregnated roving material and provides a reinforcing ring within the end turns of the coil which cooperates with an external reinforcing ring about the outer periphery of the outer arms of the coil end turns to hold the coils end turns from movement.

While the present invention has been described with particular respect to the supporting of the end turns at one end of a dynamoelectric machine, it is readily apparent that it could also be utilized for supporting the end turns at both ends of such a machine.

While there have been illustrated and described, particular embodiments of this invention, further modifications and improvements thereof will occur to those skilled in the art. It is to be understood therefore that this invention is not limited to the particular embodiment shown and it is intended in the appended claims to cover all modifications thereof which do not depart from the spirit and scope of this invention.

What I claim as new and desire to secure by Letters Patent of the United States is:

1. A member for a dynamoelectric machine comprising a core formed of magnetic material and having coil receiving slots formed therein, form wound coils in said slots having end turns projecting beyond the ends of said slots, and means for supporting said coil end turns comprising a first support ring positioned concentrically around said end turns and a second support ring arranged in substantially the same radial plane as said first support ring between the inner and outer arms of said end turns formed of an impregnated roving, means comprising loops formed of impregnated roving formed integrally with said second support ring binding said end turns to said rings, said roving comprising an initially flexible fibrous material impregnated with a thermosetting resinous composition cured after assembly on said end turns to produce a rigid connection between said end turns and said rings.

2. A member for a dynamoelectric machine comprising a core formed of magnetic material and having coil receiving slots formed therein, form wound coils in said slots having end turns projecting beyond the ends of said slots, and means for supporting said end turns comprising a first support ring arranged concentrically with said end turns and an impregnated roving comprising loops securing said end turns to said first support ring, said roving forming crossovers between adjacent loops at their radially inner extent to provide a second concentric support ring substantially in the same radial plane as said first support ring, said roving comprising an initially flexible fibrous material impregnated with a thermosetting resinous composition baked after installation to rigidly support said end turns by said rings.

3. A stator for a dynamoelectric machine comprising a core formed of magnetic material and having coil receiving slots formed therein, coils in said slots having ends turns projecting beyond the end thereof, and means for rigidly supporting said end turns comprising a first support ring surrounding said end turns and an impregnated roving forming a plurality of loops to bind the outer arms of said end turns to said first ring and forming an integral inner support ring integral with said loops arranged substantially in the same radial plane as said first support ring at the inner peripheries of said outer arms, said roving comprising a loosely constructed initially flexible material having substantially parallel fibers impregnated with a thermosetting resinous composition cured after installation to rigidly support said end turns from said rings.

4. The method of supporting the coils for a member of a dynamoelectric machine having end turns provided with inner and outer arms comprising the steps of placing an insulated support ring around the periphery of the outer arms of said end turn portions, enveloping said ring and the outer arms of said end turns sequentially with a plurality of loops of flexible roving impregnated with a thermosetting resinous material, tightening and cinching each of said loops to draw said outer arms firmly against said first ring and integrally connecting adjacent loops at their inner peripheries with said flexible roving to form a second support ring within the closed end turns of the coil in substantially the same radial plane as said insulated support ring, and thereafter curing said thermosetting resinous composition to support the outer arms of said end turns between a pair of rigid support rings.

5. The method of supporting the coils of a member of a dynamoelectric machine having end turns provided with inner and outer arms comprising the steps by placing an insulated support ring in a position around the periphery of the outer arms of said end turns positioning a spacing block between adjacent pairs of outer arms, sequentially encircling said support ring, a spacing block and each adjacent pair of end turn outer arms with loops of flexible roving impregnated with a thermosetting resinous material, lacing an end of said roving beneath said loops at a point at the inner peripheries of said outer arms, tightening each loop to pull the adjacent pair of outer arms snugly against the outer support ring in sequence so that the crossover portion of the roving between adjacent loops forms a second support ring at the inner peripheries of said outer arms substantially in the same radial plane as said outer support ring, and thereafter curing said thermosetting resinous material.

References Cited in the file of this patent

UNITED STATES PATENTS

| | | |
|---|---|---|
| 2,437,990 | Askey | Mar. 16, 1948 |
| 2,602,829 | From et al. | July 8, 1952 |